UNITED STATES PATENT OFFICE.

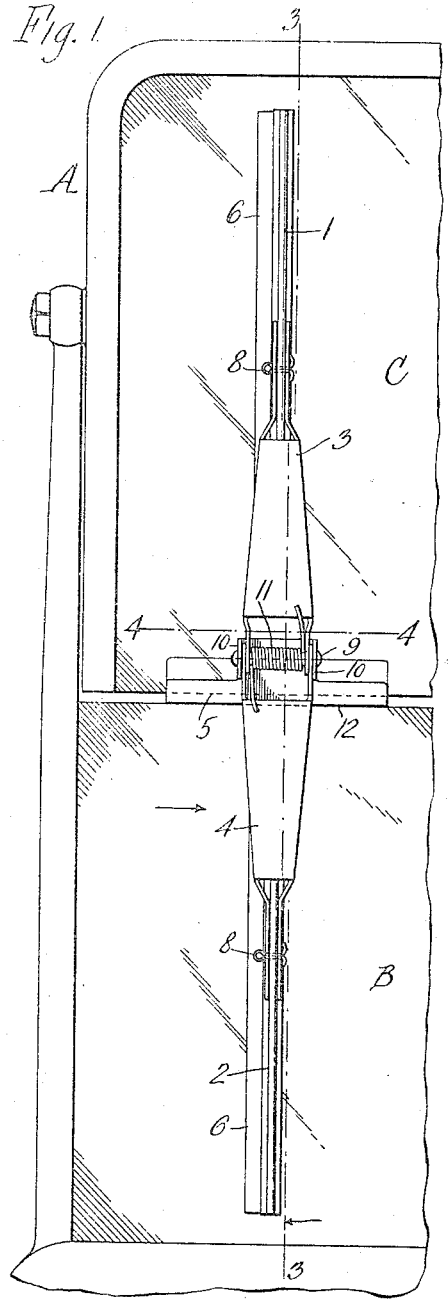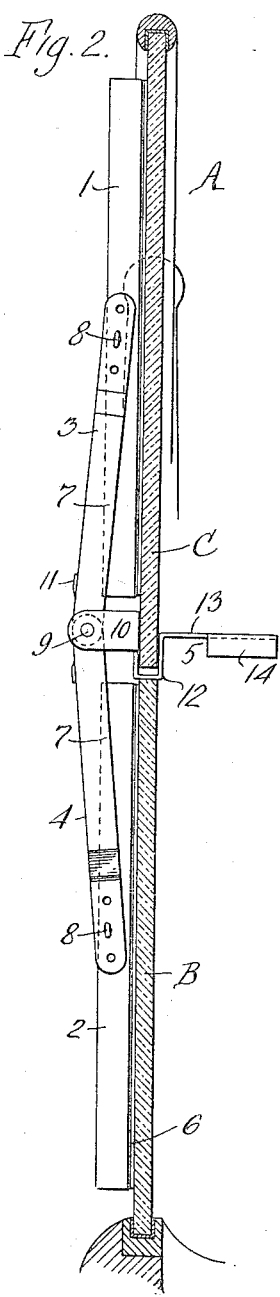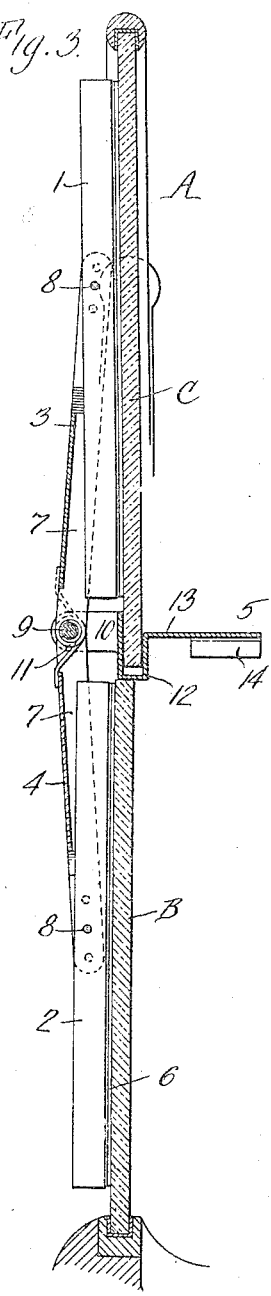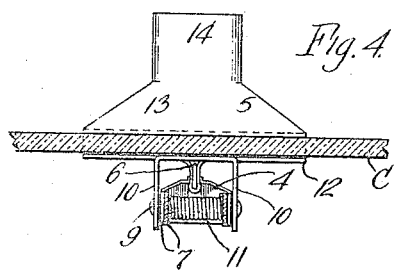

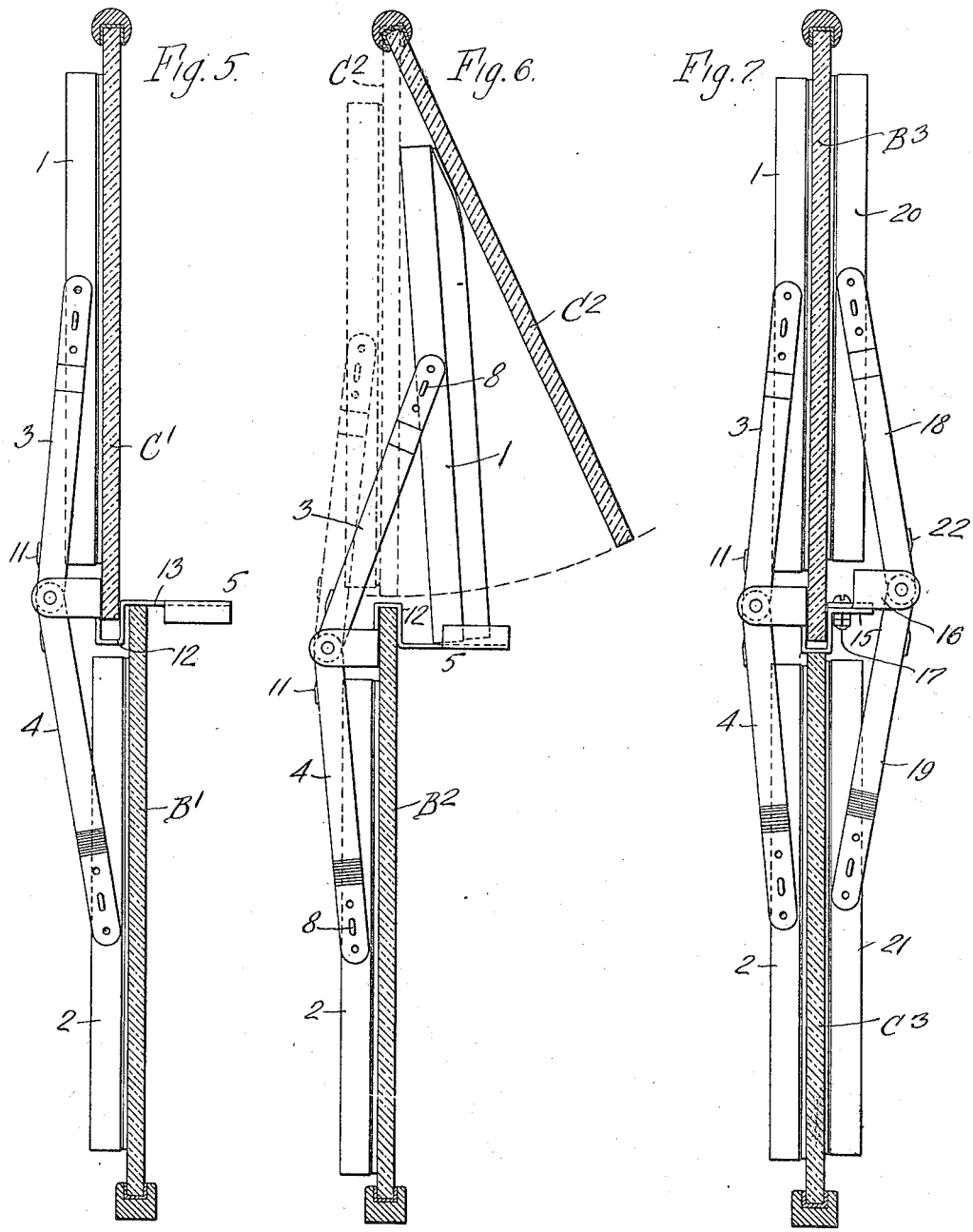

JOHN W. JEPSON, OF BUFFALO, NEW YORK.

WIND-SHIELD CLEANER.

1,183,463.   Specification of Letters Patent.   Patented May 16, 1916.

Application filed February 26, 1916. Serial No. 80,627.

*To all whom it may concern:*

Be it known that I, JOHN W. JEPSON, a citizen of the United States, residing at Buffalo, in the county of Erie and State of New York, have invented a new and useful Improvement in Wind-Shield Cleaners, of which the following is a specification.

This invention relates to wind shield cleaners, or devices which are used for wiping rain water, snow and the like from the glass wind shields of automobiles.

The objects of the invention are to provide a desirable and practical wind shield cleaner of simple and inexpensive construction which can be readily placed in position and used on wind shields without the use of tools and without requiring the wind shield to be taken apart; also to produce a cleaner that is adapted to simultaneously clean both sections or glasses of wind shields having a hinged section arranged to swing to different angular relations to another section, and which will properly clean both glasses irrespective of whether they are positioned in a common plane; also to provide a wind shield cleaner of improved construction which is held in position and guided in use by a supporting member which extends through the slit between the adjacent edges of the two sections of the wind shield; also to construct the cleaner so that it is adapted, by placing it in one or another operative position to be used on wind shields of different makes or constructions; and also to produce a windshield cleaner of improved construction in the other respects herein described and set forth in the claims:—

In the accompanying drawings: Figure 1 is a fragmentary front elevation of a wind shield, showing in operative position thereon, a cleaner embodying this invention. Fig. 2 is a vertical section of the wind shield showing the cleaner in side elevation. Fig. 3 is a sectional elevation in line 3—3 Fig. 1, but showing the upper section of the wind shield out of alinement with the lower section. Fig. 4 is a sectional plan view thereof, in line 4—4, Fig. 1. Fig. 5 is a sectional elevation showing the cleaner applied to a wind shield of that kind in which the adjacent edges of the two sections overlap. Fig. 6 is a similar view showing the cleaner applied to a wind shield in which the upper section swings inwardly or rearwardly. Fig. 7 is a similar view showing a double cleaner adapted to simultaneously clean both the front and rear faces of the wind shield.

Referring first to Figs. 1–4 of the drawings, A represents a wind shield of that kind comprising a stationary lower section or glass B and an upper section or glass C which is adapted to stand in the same vertical plane as the lower section and is hinged so that its lower edge is adapted to be swung toward and from the plane of the lower glass. The cleaner as shown in these figures, comprises upper and lower wipers or wiping bars 1 and 2, which are adapted to bear respectively against the upper and lower glasses of the wind shield and are pivoted to the outer ends of arms 3 and 4 which are hinged at their adjacent ends to a supporting member or plate 5 adapted to extend through the slit between the two sections of the wind shield for the purpose of supporting and guiding the cleaner and providing an operating handle therefor at the rear side of the wind shield. Each of the wipers can be of any ordinary or suitable construction, consisting for instance, of a bent metal strip between the walls of which is secured a flexible wiping strip 6, of rubber or the like, adapted to bear on the surface of the glass, and the wipers can be pivoted between their ends to the hinged arms 3 and 4 in any suitable manner, or otherwise movably mounted on the supporting member 5, so that they can assume the positions necessary for them to bear throughout their length against the surfaces of the glasses of the wind shield. Each of the arms 3 and 4 is conveniently made of a piece of sheet metal provided with side bars or flanges 7, bent at right angles to the connecting body portion of the arm and the wipers are pivoted between these side bars of the arms by cotter pins 8, passing through holes in the arms and wiping bars. The wipers are thus adapted to swing on their pivots to different angular relations to the hinged arms 3 and 4 but are held between the side bars of the arms from substantial lateral play or movement. The adjacent ends of the arms 3 and 4 are hinged to this supporting plate 5 as by a pin 9 passing through holes in the projecting ends of the side bars 7 of the arms and in forwardly projecting vertical ears 10 on the supporting plate 5. A spring 11 surrounding the pin 9 and bearing at its ends against the arms 3 and 4 acts to swing these arms toward the wind shield and press the wipers 1 and 2 against the surfaces of the wind shield glasses. The supporting plate or member 5 is preferably formed from a piece of sheet metal bent into the shape shown to provide the hinge ears 10 for the arms 3 and 4, and a grooved or channel-shaped portion 12, which is adapted to embrace and slide along the edge of one of the wind shield sections for guiding the cleaner when in use. The supporting plate or member also has a horizontal portion 13 which projects rearwardly from the channel part 12, and the sides of this rearwardly projecting part 13 are preferably bent downwardly and toward each other to form a suitable handle 14 adapted to be grasped for moving the cleaner back and forth across the wind shield to clean it.

The cleaner is adapted to be placed on a wind shield as shown in Figs. 1, 2 and 3, in which it will be seen that the channel part 12 of the supporting member embraces the lower edge of the upper section C and rests upon and is supported by the upper edge of the lower section B of the wind shield. The lower edge of the upper section thus holds the cleaner from displacement forwardly and rearwardly and the lower section supports the cleaner and prevents its disengagement from the lower edge of the upper section. The cleaner is moved horizontally across the wind shield to wipe the same by means of the handle 14, which projects rearwardly or inwardly from the wind shield. Since the wiping bars are pivoted between their ends to the hinge arms 3 and 4, they are adapted to, and will swing relative to the arms so as to bear from end to end on the surfaces of two sections or glasses of the wind shield, and it is not necessary for the two sections of the wind shield to be in the same plane to enable the proper operation of the cleaner. Fig. 3 illustrates the position of the parts when the two sections of the wind shield are not in the same plane. The cleaner can be readily applied to the wind shield shown in Figs. 1–3 by simply swinging the upper section C of the wind shield forwardly, slipping the channel part 12 of the supporting member on the lower edge of this section and then swinging the upper section back to its position above the lower section.

Fig. 5 illustrates the application of the cleaner to a wind shield of that kind in which the lower edge of the upper section C' overlaps or extends downwardly in front of the upper edge of the lower section B'. When used on a wind shield of this sort the channel part 12 of the supporting member is slipped over the lower edge of the upper glass while the latter is swung forwardly away from the lower section, and the horizontal part 13 of the supporting member extends rearwardly over the top edge of the lower section, as shown in Fig. 5. In this case the cleaner is supported by its horizontal part 13 resting upon the upper edge of the lower section and is guided and held from forward and rearward movement by its channel part 12 embracing the lower edge of the upper section.

When the cleaner is to be used on a wind shield in which the upper section $C^2$ can only be swung rearwardly or inwardly the cleaner is inverted, as shown in Fig. 6, so that the channel part 12 of the supporting member faces downwardly and embraces the upper edge of the lower section $B^2$. After the cleaner has been thus placed in position on the upper edge of the lower section, the upper section can be swung forwardly again to its position above the lower section. In this case the cleaner is both supported and guided by the lower glass or section.

In Fig. 7 is shown a double cleaner comprising two cleaners substantially like that described, one for the front face and the other for the rear face of the wind shield. The front cleaner comprises wipers 1 and 2 pivoted to spring pressed arms 3 and 4 and a supporting member or plate to which the arms are hinged and which extends through the slit between the sections of the wind shield for slidably supporting the cleaner just as in the construction above described. The handle is, however, omitted from the supporting plate 15, and a plate 16 is detachably secured thereto at the rear side of the wind shield by screws or other suitable fastenings 17, and this plate 16 has arms 18 and 19 hinged thereto and carrying pivoted wipers 20 and 21 for the rear faces of the lower and upper sections $B^3$ and $C^3$ of the wind shield. The arms 18 and 19 are preferably constructed and hinged to the plate 16 and the wipers 20 and 21 are pivoted to the arms in the same manner as the corresponding parts for the front side of the wind shield, and a spring 22 operates as in the other construction to press the wipers yieldingly against the glasses of the wind shield. The rear cleaner can be readily secured in place on the supporting plate 15 by attaching its carrying plate 16 thereto after the plate 15 has been placed in position between the two sections of the wind shield.

I claim as my invention:—

1. A cleaner for wind shields having two sections separated by a slit, comprising a supporting member which extends through said slit and is supported by one of said sections and has a part engaging one of said sections for holding the cleaner in sliding connection with the wind shield, an arm movably connected to said member, means for pressing said arm toward the wind shield, and a wiper movably connected to said arm and held thereby against the face of the wind shield.

2. A cleaner for wind shields having two sections separated by a slit, comprising a supporting member which extends through said slit and is slidably supported by the wind shield, arms movably connected to and extending in opposite directions from said member, means for pressing said arms toward the wind-shield, and independently adjustable wipers carried by said arms and held thereby against the faces of said sections.

3. A cleaner for wind shields having two sections separated by a slit, comprising a supporting member which extends through said slit and is slidably supported by the wind shield, independent wipers for the two wind shield sections, and means connecting said wipers to said supporting member which permit independent adjustment of said wipers relative to the wind shield sections, and means for pressing the wipers against the faces of said sections.

4. A cleaner for wind shields having relatively movable sections, comprising a supporting member slidably supported adjacent the division between said sections, independently movable arms extending from said supporting member, means for pressing said arms toward the wind shield, and independently adjustable wipers carried by said arms and held thereby against the faces of said sections.

5. A cleaner for wind shields having two sections separated by a slit, comprising a supporting member which extends through said slit and has a channel-part embracing the edge of one of said sections for holding the cleaner in sliding connection with the wind shield, a wiper for one of the wind shield sections movably supported by said supporting member and adapted to adjust itself to the face of said section, and means for pressing the wiper against the face of said section.

6. A cleaner for wind shields having two sections separated by a slit, comprising a supporting member which extends through said slit, and has a channel part embracing the edge of one of said sections for holding the cleaner in sliding connection with the wind shield, independent wipers for the two wind shield sections movably supported by said supporting member and independently adjustable thereon relative to said sections, and means for pressing said wipers against the faces of said sections.

7. A cleaner for wind shields having two sections separated by a slit, comprising a supporting member which extends through said slit, and has a channel-part embracing the edge of one of said sections for holding the cleaner in sliding connection with the wind shield, independent wipers for the two wind shield sections, arms hinged to said supporting member and to which said wipers are pivoted, and means for pressing said arms toward the wind shield and holding said wipers against the faces of said sections.

8. A cleaner for wind shields having two sections separated by a slit, comprising a supporting member which extends through said slit and has a channel-part embracing the edge of one of said sections for holding the cleaner in sliding connection with the wind shield, independent wipers for the two wind shield sections, arms hinged to said supporting member and to which said wipers are pivoted, and a spring acting on said arms for pressing said wipers yieldingly against the faces of said sections.

9. A cleaner for wind shields having two sections separated by a slit, comprising a plate which extends through said slit and has a channel-part embracing the edge of one of said sections for holding the cleaner in sliding connection with the wind shield and a handle at the rear side of the wind shield, an arm hinged to said plate at the front side of the wind shield, a wiper pivoted to said arm, and a spring acting on said arm for pressing the wiper against the face of the wind shield.

10. A cleaner for wind shields having two sections separated by a slit, comprising a supporting member which extends through said slit and is supported by one of said sections and has a part engaging one of said sections for holding the cleaner in sliding connection with the wind shield, wipers for the opposite faces of the wind shield movably mounted on said supporting member in front and in rear of the wind shield, and means for pressing the wipers against the faces of the wind shield.

11. A cleaner for wind shields having two sections separated by a slit, comprising a supporting member which extends through said slit and is supported by one of said sections and has a part engaging one of said sections for holding the cleaner in sliding connection with the wind shield, wipers for the opposite faces of the wind shield movably mounted on said supporting member in front and in rear of the wind shield, and means for pressing the wipers against the faces of the wind shield, one of said wipers being removably mounted to permit the supporting member to be placed between the wind shield sections.

Witness my hand this 24th day of February, 1916.

JOHN W. JEPSON.

Witnesses:
C. W. PARKER,
M. J. PITMAN.